Dec. 28, 1937.  D. H. WELLS  2,103,572

FILTER

Filed July 22, 1936  2 Sheets-Sheet 1

Inventor
Donald H Wells
By W. S. McPowell
Attorney

Dec. 28, 1937. D. H. WELLS 2,103,572
FILTER
Filed July 22, 1936 2 Sheets-Sheet 2
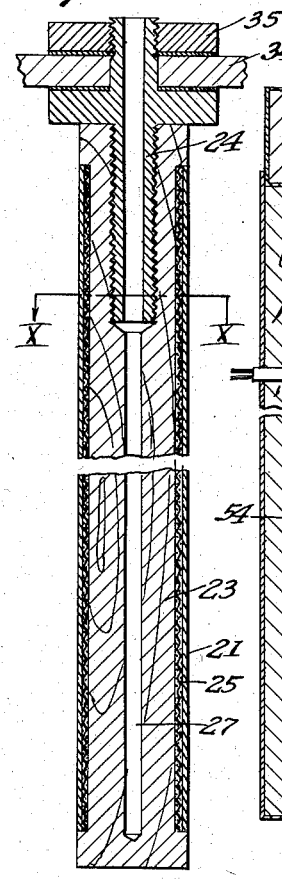
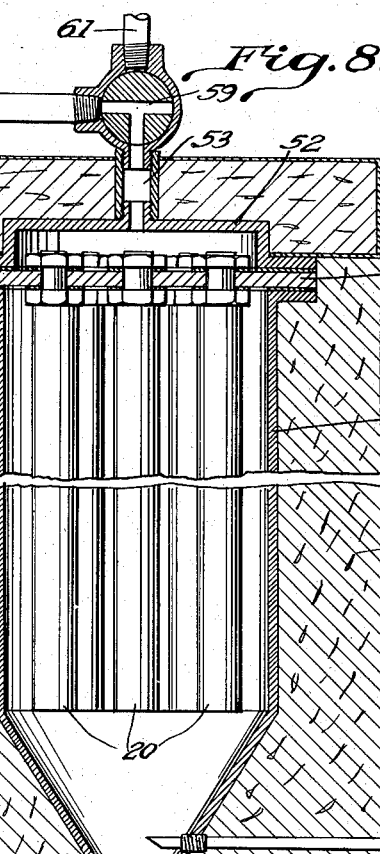
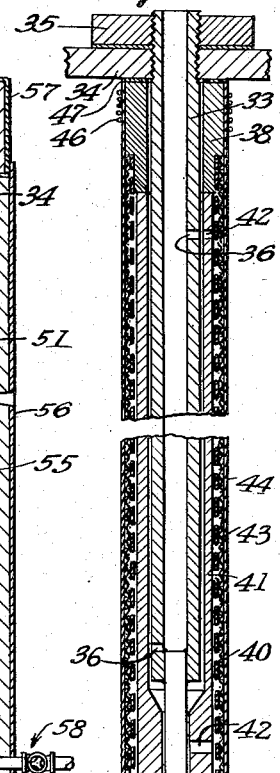
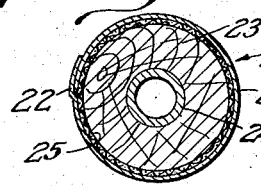
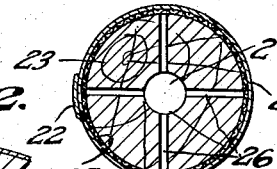
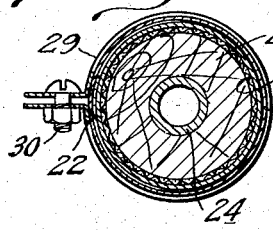
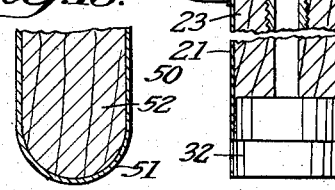
Inventor
Donald H Wells
Attorney Patented Dec. 28, 1937

2,103,572

UNITED STATES PATENT OFFICE 2,103,572

FILTER

Donald H. Wells, Glen Ellyn, Ill.

Application July 22, 1936, Serial No. 91,925

13 Claims. (Cl. 210—204)

This invention relates to the art of filtering liquids to effect the removal of solids therefrom, particularly fine solids, and has special reference to the provision of a novel filtering medium or media which will remove solids from the liquids undergoing filtration in a more efficacious manner than filters of conventional design. In other aspects, my invention has reference to the operation of the improved filter media and their adaption to various uses. It is an object of the present invention to provide improved filtering media which will remove fine solids from liquids, particularly in the matter of reducing the accumulation of solid particles of deleterious matter in the lubricating systems of internal combustion engines, although the invention is applicable to uses other than that of filtering the lubricating oils of internal combustion engines.

One of the outstanding objects of the present invention resides in the provision of a novel filtering medium consisting of paper or cloth treated with a potentially reactive resin, prepared from phenol and an aldehyde, and subsequently heat treated, so that when said medium is properly placed in a fluid-tight shell, or otherwise supported so that the liquid to be filtered may be forced through it, the resin-treated media will function to remove fine solids from the liquids, thus effecting the formation of a filter cake on the surface or surfaces of the media and the desired passage of the solid-free liquids through the media to the outlet of the filter.

Another outstanding object of the present invention is to provide a filter or filter medium from which accumulated solids (filter cake) may be discharged during each cycle, whereby to maintain the efficiency of the filter over prolonged periods of use. The attainment of this object has been particularly difficult and complex when it is considered that the liquids or oils undergoing filtration contain large quantities of particles of colloidal size. The filter cake from my improved filter media may not only be discharged but, because of the peculiar form of the media, its porosity may be maintained to a high percentage of that originally present by forcing a gas and/or filtered liquid through the medium in a reverse direction to that of filtration. This results in loosening the accumulated filter cake so that it may be removed from the surface of the filter medium on which it accumulated. My improved filter medium will withstand the successive operations for extended periods of time without becoming clogged, substantially losing its filtering capacity or rupturing through structural weakness.

The present invention consists primarily in the provision of improved filtering media comprising paper, having a wood, rag or asbestos base, or a closely woven cloth or fabric, the said medium being treated with a phenol-formaldehyde resin and heat treated or baked, whereby the fine pore structure of the medium will be preserved and mechanically strengthened or reenforced to provide a filter medium of low cost and of long life.

Other objects of the invention reside in the provision of a novel filter medium possessing, among others, the following characteristics or properties:

To remove solids from crank case oil in a single passage of such oil through the filter.

The provision of a reenforcement or "binder" made from a phenol-formaldehyde resin (bakelite) which when heat treated or baked on the fibrous filter medium will mechanically hold the fibers of wood, rag or asbestos pulp of the filter medium in position so that such fibers will not become compressed against each other but will continue to filter at an economical and efficient rate for extended periods of service;

In the provision of a binder made from a phenol-formaldehyde resin which when applied to the filter media and baked thereon, will not dissolve or decompose, but will last almost indefinitely when immersed in oil or water at a temperature not substantially in excess of 212° F.;

A filter which, when attached to an associated engine will employ a sufficiently low flow of crank case oil so that the full oil pressure of the engine can be applied to the filtering medium at operating temperatures, or higher, so that a quantity of oil will pass through the filter which will be small enough not to interfere with the desired flow of oil to the moving engine parts and yet the filter will have a sufficient area and filtering capacity to keep the oil in the engine clean and free from deleterious solids over a long period of use;

The provision of a filter which possesses a large filtering area per unit volume of the shell or container in which the filter media are arranged, and in various other objects and advantages which will be in part obvious and in part pointed out hereinafter.

For a further understanding of the invention, reference is to be had to the following description and the accompanying drawings, in which:

Fig. 8 is a vertical sectional view of a filter suitable for use in discharging accumulated filter cake from the external surfaces of the filter media employed by the present invention;

Fig. 9 is an enlarged longitudinal sectional view of a filter element, using the filter structure disclosed in Fig. 8;

Fig. 10 is a transverse sectional view on the line X—X of Fig. 9;

Fig. 11 is a similar view of a slightly modified form;

Fig. 12 is a transverse sectional view disclosing a means for calking paper to seal the edges thereof;

Fig. 13 is a longitudinal sectional view of a replacement tube filtering element, showing one end thereof closed with a plug;

Fig. 14 is a transverse sectional view on the line XIII—XIII of Fig. 13;

Fig. 15 is a similar view of a replacement tube media with one end closed;

Fig. 16 is a longitudinal sectional view of a complete element for use with a replaceable filter medium.

Figure 1:
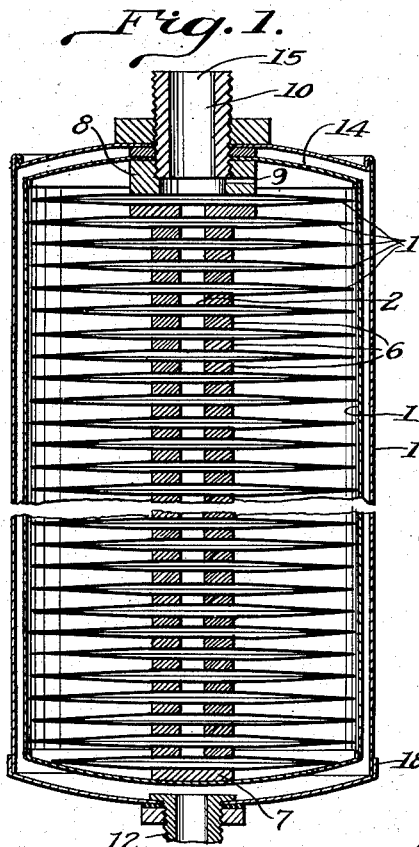
Fig. 1 is a longitudinal sectional view taken through a filter constructed in accordance with the present invention and wherein the filter media are of leaf formation.
Figure 3:
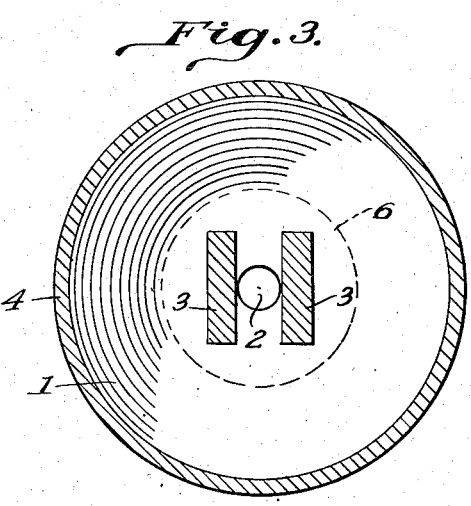
Fig. 3 is a transverse sectional view of a filter leaf formed in accordance with the present invention, the plane of the section being indicated by the line III—III of Fig. 2.
Figure 4:
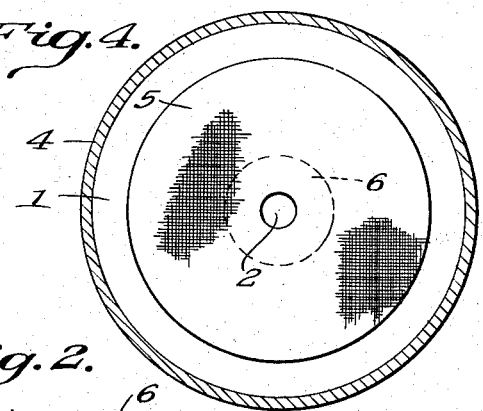
Fig. 4 is a transverse sectional view of a modified form of leaf made from my filter medium.

An essential part of this invention consists in treating a porous material composed of fibers with a thermo-plastic cement or "sizing" which is subsequently hardened. The fibers may be various kinds of cellulose, such as those in cloth or paper, or asbestos, glass, limestone, or any other material which may be formed to present closely matted or interwoven fibers. The thermo-plastic sizing preferably should be one which does not soften, decompose or dissolve in oil or water at temperatures not substantially in excess of 212° F. over an almost indefinite period.

The physical forms which my improved filter media may take are almost as varied as their uses. In Figs. 1 to 4 inclusive, there is disclosed the "leaf" type filter, and in Figs. 8 to 16 inclusive there is disclosed the filter media in the form of tubes, the latter form being particularly useful where a high reverse pressure is necessary to discharge external cake accumulations. The filter media may be used in flat sheets and also in other numerous mechanical forms.

Since details of construction will depend upon the type of service in which the filter is to be placed, I will now describe the construction of the leaf type filters disclosed in Figs. 1 to 4 and which fall under the general classifications of filters for the slow-filtering liquids and filters for the free-filtering liquids.

An excellent example of filters for the slow-filtering liquids is the attachment type used for removing solids from crank case oil. The viscosity of the liquid and the fine nature of the solids in the cake that forms on the filter produce a low rate of liquid flow, hence the term "slow filtering".

In Figs. 1 to 4, the numeral 1 represents a circular disk of paper or other porous fibrous material treated with a thermo-plastic and hardened, the center of the disk being provided with an opening, indicated at 2. To produce a leaf, two such disks are separated, for instance, with strips of similar material shown at 3, although longer strips may be used, or any suitable number thereof, and the strips may be located in radial positions, instead of the spaced parallel order disclosed. These strips provide for drainage between the disks of each leaf and when relatively thick disks are employed, two of such strips are usually sufficient for this purpose. The disks are cemented together along their peripheral edges as at 4 with a suitable thermo-plastic and are allowed to harden to form the complete filter leaf.

The selection of the paper to be used in the formation of the disks 1 again depends upon the service in which the filter will be placed. A rag base and an asbestos paper both give excellent life when treated with the thermo-plastic cement or sizing and when used for oil filtration. Spun glass or glass wool in which the fibers are very small resist decomposition very well and may be used in my filter medium when held together by means of the thermo-plastic specified.

In the preferred form of my invention, the thermo-plastic used for sizing is, as stated, a phenol formaldehyde resin. It may be diluted with a solvent, and in fact, unless it is very thin it must be diluted with a solvent. The amount of impregnation may be controlled by (1) the viscosity of the phenol-formaldehyde resin, (2) the amount of solvent used and, (3) the amount of pressure applied to the paper after it has been soaked in the impregnating liquid.

A solution of approximately 20% of phenol-formaldehyde resin in ethyl alcohol will usually give the right amount of bond to rag base paper, will not stop the pores, and will produce a paper of very high strength. However, solutions from less than 1% to more than 50% may be used, and when treating asbestos paper, a 50% solution has been found to be quite satisfactory. There, again, the quantities may be varied, the concentrations used depending upon the strength desired and the porosity of the material treated.

If the sheets of paper are to be dried separately after being impregnated with the phenol-formaldehyde resin solution in alcohol, a heavy resin may be used. However, if the sheets of paper, for instance, are cut into disks and stacked, and the stack is impregnated and dried as a unit, the phenol-formaldehyde resin should be of low viscosity or else it will be deposited near the surface when the alcohol evaporates and the center of the disk will be insufficiently impregnated. When drying a stack of paper disks, it is therefore preferable to use a resin of less than 500 centipoise viscosity so that the excess may be pressed from the paper before baking or hardening. The important part of the procedure is to leave the correct amount of resin evenly distributed in the paper, and the method of applying the resin may be varied to suit different circumstances. In fact, the solvent may be entirely eliminated and the thin resin may be pressed from the paper until just the right quantity remains. A satisfactory resin for this purpose is obtainable commercially as Bakelite, Br-0013 or Br-0014. These preparations comprise potentially reactive resins prepared from phenol and formaldehyde. The commercial names of the products are given to facilitate identification, but it will be understood that other types of resins may be used with satisfactory results.

After removal of the excess resins (and solids, if present) the sheets or disks are dried and baked, that is, hardened. To give strength of bond, the temperature should be raised gradually until 250 or 300° F. is reached. Ordinarily a finished bake of fifteen to twenty hours at 300° F. is satisfactory for any use and in many cases, the phenol-formaldehyde resin does not have to be baked over four or five hours after a temperature of 250° F. is reached.

The thermo-plastic used to seal the peripheries of the disk, as indicated at 4, is a partial reaction product of phenol and formaldehyde in substantially equi-molecular proportions, of the potentially reactive type, that is, one that can be advanced to a state of insolubility and infusibility by the action of a hardening agent. A suitable cement of the type described is known commercially as Bakelite XC-3931. It is preferable that this resin should be diluted with a solvent. After being applied to the peripheries of the disks, the cement may be air dried at room temperatures in from four to eight hours, then dried two hours in an oven at 140 to 150° F., until it appears to be semi-solid and will not flow.

Figure 2:
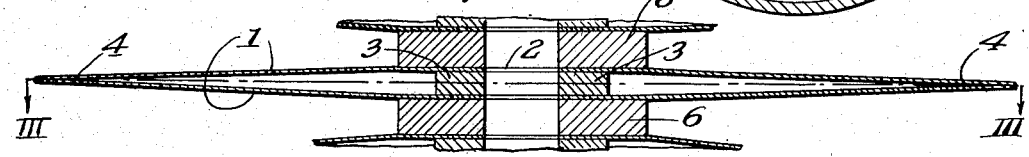
Fig. 2 is a similar view on an enlarged scale of one of the filter leaves used in the filter shown in Fig. 1.

Another disk, identical with respect to material, size and impregnation to the disk disclosed at 1 in Fig. 2, and with or without drainage strips 3 attached to it, may be superimposed in a loose manner over disk 1 before the drying operations, and after the two hour drying period at 140 to 150° F., the two disks may be pressed together at their peripheries 4 between warm metal plates. This supplies a bond action between the two disks at the periphery which holds them in place while the baking is finished at 250 to 300° F. as described above.

An alternate method and one which works equally well but is perhaps slightly more positive, is to string the leaves on a rod after the drying operations and apply spring tension while baking above 140 to 150° F. After being so baked, the leaf consists of two disks separated at the center by means of the drainage strips 3 and sealed at the edges 4. The periphery cement at 4 may be baked before, during or after (preferably the latter) the heat treatment given to the impregnating or sizing materials.

The strips 3 furnish sufficient drainage only when the disks 1 are relatively thick, for instance 0.020 to 0.030 inch thick. For thinner disks, a drainage wafer 5, shown in Fig. 4, may be used, said wafer varying in thickness from .003 in thin paper to the thickness of heavy cloth.

In filters for the free-filtering of liquids, when the rate of flow through the filter medium is high, proper drainage ordinarily cannot be secured with the use of the strips 3 even if thick paper disks are used. In these cases, the two disks are separated by: (a) strips of impregnated paper either crossing each other or disposed in a radial position, (b) through the use of a cloth disk, as indicated at 5 in Fig. 3 of the drawings, (c) one or more wire screen disks, or (d) a combination of strips, cloth or screen. For instance, in water filtration, using disks having a diameter of four inches, and a pre-coat of activated carbon, sufficient drainage at the beginning of a cycle can be obtained with the employment of three superimposed screen disks.

Assembly of the leaves in the filter shell will depend again upon the use to which they will be placed. In the drawings, two forms of shells or casings have been disclosed: (1) the double shell by-pass and (2) the single or double shell clean outlet type.

In Fig. 1, there has been disclosed the double shell, by-pass type which has been especially designed for use as an attachment to automotive engines in the filtration of crank case oil wherein the lubricating oil in an internal combustion engine is filtered without removal from the engine assembly, of which the filter attachment forms a part.

The finished filter leaves are assembled together with intervening spaces to allow room for cake formation between each leaf. The spacers, indicated at 6, are cemented in place between the leaves preferably with the same cement used in joining the peripheries 4 of the adjacent disks, which joins the spacers with the leaves and produces a fluid-tight joint between the same. These spacers are made preferably of a fibrous material, such as fiber board, press board, heavy wood or asbestos sheets, and may be impregnated with a solution of phenol-formaldehyde resin ranging from a concentration of 50% alcohol to a pure resin. After the impregnation, the spacers are either partially or fully baked before assembly. By partially baking the resin impregnated spacers, they are pliable when cemented and assembled to the leaves 1 so that they readily cake and bind to them, and yet the resin is hard enough so that it does not soak the porous disks comprising the leaves and fill the drainage spaces. This effect may be secured by baking the resin in the spacers only about one hour after a temperature of 200° F. is reached and before assembly.

The bottom leaf is sealed with a round disk or blank spacer, or with an ordinary spacer in which threads have been placed so that the opening in the center thereof may be stopped with a plug, the former construction being indicated at 7. The top disk is sealed to a tube indicated at 8 in which a lateral orifice 9 of predetermined size is placed. The combination of leaves 1, the spacers 6, the blank spacer 7 and the collar 8 is connected in a liquid-tight manner with the outlet nipple 10 of the containers 11 and 18.

The filter is mounted on an internal combustion engine such as that used in a farm tractor, automobile, Diesel engine and the like, or in any convenient position so that oil from the lubricating system may be forced by means of a large tube through the filter by way of the inlet 12. The oil first passes between the container 11 and the shell 13, heating the filter assembly and then passes through the opening 14 into the inner container, and is diverted into two channels. Part of it passes through the leaves 1, thereby removing the solids which are deposited on the outer surfaces of the resin impregnated paper. The rest of the oil, entering the inner container through the opening 14, passes through the small orifice 9 to join the filtrate which passes through the filter outlet 15 and is returned to the engine crank case, or to the bearings requiring lubrication, by suitable piping.

When the engine to which the filter is attached is idle, the oil in the filter cools to a point where the viscosity is such that it can not be forced through the impregnated paper filter media when the engine is started. However, with the construction here disclosed, when the engine is started and oil pressure developed, the oil immediately passes through the orifice 9 so that oil in the filter is replaced with warm oil from the engine crank case. This warm oil heats the oil in the inner container until it passes through the filter media. Large piping is preferably used to and from the filter, so that practically full engine pressure is maintained in the filter on the outside of the leaves, and zero pressure on the outlet or inside of the leaves, thus allowing for full filtering differential pressure.

The inner jacket or container 11 serves to prevent washing settled solids back into the oil stream passing through the upper opening 9, and to collect and hold water which settles or is filtered out. Should the filter be mounted in a horizontal position, the opening 14 would be on the upper side. The inner jacket, however, is not indispensable, and the by-pass system of warming the oil in the filter, under certain circumstances, may be used without it.

Figure 7:
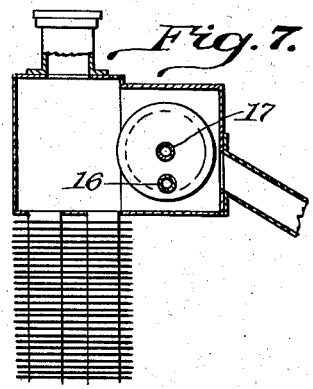
Fig. 7 is a side elevation of a motor vehicle radiator, partly in section, and disclosing a filter formed in accordance with the present invention located in the reservoir thereof.
Figures 5, 6:
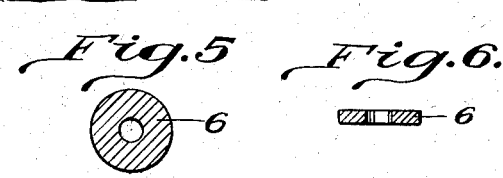
Fig. 5 is a transverse sectional view of a spacer used between adjoining leaves.
Fig. 6 is a longitudinal sectional view of the spacer disclosed in Fig. 5.

The filter may be heated by locating it in the reservoir of the water cooling radiator of an internal combustion engine, as shown in Fig. 7. In this construction, the shell containing the filter assembly and oil is fastened in the reservoir of a radiator, in a substantially horizontal position, but the end of the shell is removable, so that the filter assembly may be removed at will and replaced. The water in the radiator acts as a heating medium only because it surrounds the shell holding the oil. In this construction, the collar 8 in the filter assembly does not have an orifice 11, but is liquid-tight so that all of the oil that enters the filter through the inlet 12 must pass through the leaves 1 before returning to the engine.

In Fig. 7, the filter inlet has been indicated at 16 and the outlet at 17. The location of a filter at this position achieves the same results as those secured by a filter with a jacket through which the liquid coolant is circulated, as described in my prior applications, Serial No. 719,150 filed Apr. 5, 1934 and Serial No. 745,597 filed Sept. 26, 1934 of which this application is a continuation-in-part. This construction also offers certain other advantages, especially with tractors having cast iron radiators, and which do not use water circulating pumps or thermostats in the cooling systems. When engines operate continuously so that the crank case oil is maintained most of the time of operation at 120 to 200° F., or when engines are equipped with oil pumps which maintain exceptionally high oil pressures, or when the crank case oil is of low viscosity, and/or when the crank case oil becomes abnormally diluted with the fuel, the means of heating the filter with a heating liquid circulated externally may be omitted and the construction disclosed in Fig. 1 employed.

The expression "clean outlet type filter", refers to a filter assembly when used without the orifice 9 in the collar 8, thereby insuring that only filtrate passes through the outlet. The water jacketed filter belongs to this type, as well as the filter located in the radiator, each of which is used to filter crank case oil and has been described above. Leaf type filters (or the tube type hereinafter described) may be used to filter any liquid where the clarity required will warrant the rate obtained. The leaves may be made, for instance, for use on crank case oil, less than .025 inch thick, and a filter may be made with more area per unit volume of container than with the customary filters of the prior art, and still allow an equal volume for cake accumulation. Another signal advantage is the high percentage of voids that may be secured with impregnated paper, so that the rate per square foot of filtration will also exceed other types of filter media with the exception of paper, although the impregnated filter media described herein are very durable and will stand high pressures, which is not true of the usual paper filter.

As an example of other applications of the leaf or tube type filters, fuel oil filtration in connection with Diesel engines is cited. Practically all of the solid material in fuel is abrasive, and when it reaches the fuel injection equipment of a Diesel engine, it begins to erode the finely fitted surfaces normally used in all injection equipment. These moving parts are ground and polished in their manufacture and frequently measure to standards in millionths of an inch. When the fine fits on the surfaces have been changed or destroyed, the equipment no longer functions as it should, and the engine begins to exhibit symptoms of loss of power, incomplete combustion, hard starting, missing, and other forms of erratic operation. When the combustion is incomplete, carbonization of the piston rings soon follows, and it is only a question of time until the engine must be dismantled, meantime having lost its normal power and efficiency. Many troubles of this nature may be eliminated by filtering the fuel of a Diesel type engine either before placing it in the storage tank of the engine or while being fed to the cylinders through a filter of the type above described. As water is frequently present in the fuel (due to the "breathing" of moisture-laden air in and out of the storage tanks), the filter media must withstand the action of oil and water almost indefinitely, the pores must not close by compression of the fibers, and the fibers must be held so that there is no chance of escape into the fuel leaving the filter. The filter comprising the present invention is especially well adapted in meeting these requirements.

Still another example is water filtration. In such capacities, the filter leaves 1 may be given a coat of activated carbon and filter aid which will remove the chlorine and solids in water passing therethrough. Because of the wide range of porosity, a filter medium may be selected which will produce a brilliant initial filtrate at all times and prevent the fine activated carbon passing therethrough. A paper commonly known to the art as "blotting paper" when impregnated with phenol-formaldehyde resins, as set forth above, gives an excellent durable medium. Whether used in the leaf or tube form, the filter may be cleaned by reversing the flow through the leaves, and passing a fluid from the inside to the outside of the leaf. The tube type filter hereinafter described generally gives a more efficient discharge.

The leaf filter is so simple and cheap to manufacture that it may be economically discarded when filled with solids, and replaced with a new one. If the shell is made with a removable end 18, as shown in Fig. 1, the filter assembly either with or without the inner jacket 11 may be renewed. The filter assembly may be used in a metallic container to strengthen and hold it rigid in transportation, or it may be held together with a rod, wire or tube passing through the center longitudinally. Without some support, it is very flexible and can bend in any direction with an accordion-like action.

With final reference to Figs. 1 to 7 inclusive, it is obvious that with free filtering liquids, the holes 2 in the disk and the size of the spacer 6 and the holes therein, may be much larger than is required for slow filtering liquids such as used crank case oil.

After extended experience in filtering used crank case oil, I have found that if a binder is used that is insoluble in both oil and water at approximately 200° F. and does not soften at this temperature, the filter medium can be discharged of accumulated filter cake, every twelve to twenty-four hours for periods of weeks or months before renewal is necessary. However, if the binding or sizing is soluble in water, usually in a few days or less than a week, the cake refuses to break away from the filter medium at a normal air-reversed pressure, and if the pressure is increased, the paper ruptures. Therefore, a thermo-plastic binder which is insoluble in oil and water, as described above, will impregnate the properly selected filter media to achieve the desired results.

In addition to strengthening the filter medium, the phenol-formaldehyde resin makes it rather hard and tough, with a fairly smooth surface from which the cake is easily discharged. The filter medium may be shaped into tubular form and mounted in the filter, as shown in Fig. 8. The filter elements, designated at 20 are covered with paper that has been impregnated with the thermoplastic and hardened the covering being applied either in a permanent manner as shown in Figs. 9, 10, 11 and 12, or so applied that it can be readily removed and replaced with a new covering.

When filtering used crank case oils, the paper selected to cover the filtering elements should preferably be one that previous tests proved to be capable of discharge. Thin rag base papers of fine porosity will usually discharge, after impregnation with resin of the type above set forth, but the life thereof may be too short. Resin impregnated thick blotting papers of rag base usually cannot be discharged of filter cake, probably because the pores are too large. For best results with a rag base paper, thicknesses of .006 to .014 inch seem to be most desirable, and the pores should be of the right size as determined by the nature of the fiber, the method of manufacturing the paper, and the amount of impregnation with the thermo-plastic. Asbestos paper gives brilliant initial filtrates, a high rate of filtration, and the fibers are not attacked by the organic acids in the oil, nor by the oil or water present.

The paper may be curled into tubular shape while applying heat to make the shape permanent. To form the seam in the overlapping edges of the paper 21, as indicated at 22, a thermoplastic such as that previously described and used to seal the peripheries 4 of the disks or leaves 1, may be applied to the long edge, dried two hours at 140° to 150° F. and then the overlapping edges are pressed together between two pieces of warm metal. The baking may then be continued until the thermo-plastic is changed into an insoluble product. The whole tube may then be impregnated, for instance, with a 20% to 50% solution of the sizing resin in a solvent such as ethyl alcohol employed in treating the paper disks 1, dried and again baked for a short time.

The tube is then ready for cementing to the drainage and supporting element, indicated at 23, said element comprising essentially a foraminous wood or other porous tube in which is fastened the metal fitting 24. The foraminous tube is preferably covered with a very coarse paper, or screen cloth 25, which supports the filter media. In Fig. 9, the filtering medium is cemented to the wooden body 23. Fig. 11 discloses slots or holes 26 in the wood core connecting the outer surface of the core to the centrally longitudinally extending opening or bore 27 therein. The size of the slots or holes preferably should not be larger than .030 inch. In Fig. 12, the filter medium is shown as wrapped around the drainage and supporting core which exteriorly is provided with a longitudinally extending groove 28, so that cement may first be applied to the filter medium and it may then be calked into the groove and baked, making a very permanent and durable seam.

It will be noted that since the tubular filter element is cemented to the porous supporting core at the opposite ends thereof, it is necessary for the liquid to be filtered to pass from the outside through the filter tube 21, the under cover 25, the holes or slots 26, the center channel 27 and the flanged nipple 24 to reach the outlet of the filter.

A less permanent but more economical construction has been shown in Figs. 13 and 14. In Fig. 13, the tubular filter element 21 is clamped to the drainage and supporting core by means of a metal clamp 29. Although the clamp shown is tightened by the use of a bolt 30, other quicker acting clamps may be used without departing from the spirit of the invention.

In Fig. 13, a reenforcement 31 is cemented with the thermo-plastic to the tube 21 so that pressure of the clamp will not break the filter media. The reenforcement may be of the above described impregnated paper or cloth. Fig. 13 also discloses another way of sealing the lower end of the filter unit, in that the tubular filter medium 23 is permanently cemented to a plug 32. With this construction, the filter medium will usually burst first at a point just above the plug 32 where the medium is not so substantially supported. For this reason, the construction shown in Fig. 16 is generally more desirable.

In Fig. 16, the tubing 33 is secured into the plate 34 and held in place with a lock nut 35. Holes 36 are bored in the tubing 33 and a solid rod 37 is securely fastened in the lower end, the lower end of the rod being threaded. Fitting rather closely over the tubing 33 are the short tubes 38 and 39 to and between which is soldered a foraminous tube 40, such as one made from perforated plate. Within the perforated tube and on the outside of the tube 33 and rod 37 is another tube 41 provided with openings 42. This tube acts only as a filler to lessen the amount of oil remaining within the filter element when discharging. A screen or gauze 43 may cover the punch plate tube 40, although it is not indispensable.

The filter element used in this construction is a seamed or seamless tube 44 of resin impregnated paper permanently cemented to a correspondingly impregnated washer 45. The filter element is slipped over the drainage core which consists of the parts 33, 40, 38, 39, 41 and 43 and fastened thereto by means of a cable 46 wrapped around the filter element or otherwise clamped to make a liquid-tight joint. The filter element and the drainage tube is then slipped over the rod 37 and the tube 33, using gaskets as at 47 and 48. The unit is held in place by means of a nut 49 provided on the headed lower end of the rod 37. This construction permits speed in changing filter elements and the use of a very inexpensive filter element as only the resin impregnated paper 44 and washer 45 is renewed when the element fails.

A seamless tube is preferable to a tube with a seam as the cake would not discharge from the seam and this area is lost. In Fig. 15, a seamless tube 50 with a closed end 51 is shown. The foraminous core 52 over which this tube is secured should have the same contour at the lower end of the tube for support.

With these constructions, it will be noted that the path of the liquid being filtered is from the outside of the filter element 44, the liquid passing through said element, the screen or gauze 43, the slotted tube 40, the openings 42 in the inner tube, and the openings 36 in the metal tube 33 and thence to the outlet of the filter.

Returning to a simple form of discharging filter as disclosed in Fig. 8, the filtering elements 20 may be either of the permanent types or the more economical type shown in Figs. 8 to 15 inclusive. The elements are secured to the division plate 34, which is fastened in a removable manner to the shell 51, and covered with a dome 52 in which the filter outlet 53 is located.

The filter shell may be threaded in any desired manner. As indicated in Fig. 8, an electric heater is shown at 54 and for crank case oil filtration, the temperature is controlled at approximately 180° F. by thermostatic switch governing the passage of current through the electric heater. The whole filter is insulated as at 55 and the insulation covered with an outer container 56 and lid 57.

In operation, a dirty oil is fed to the filter through the feed valve 58, pressure being supplied by a montejus or pump or by vacuum applied at the filtrate outlet 53. The oil is thereby forced through the filter media, the solids remaining on the outside and the clean brilliant oil passing through the outlet 59 to a suitable container. Filtration is continued through the desired cycle but not long enough for the cakes to build together between the spaced vertically depending filter units. The cake is then discharged by allowing the unfiltered oil in the filter shell 51 to drain to the montejus or feed tank through the line 58 or into another receptacle through the sludge drain valve 60. The valve 60 is open and the three-way valve 59 is positioned to admit compressed air or other gas through the pipe 61. This permits a reverse flow, one in the opposite direction to that of filtration. The liquid in the dome 52 (which may be larger than shown to accumulate more filtrate) is first forced through the filter media and is then followed by the expelling gas. The cake falls from the filter media and is discharged into a sludge receptacle placed under the outlet 60, the filter being then ready for another cycle.

The reverse air pressure used will depend upon the strength and porosity of impregnated paper being used and may vary from five or six to as high as 100 pounds per square inch. Where only a low pressure is needed, the filter may be discharged by draining the shell 51, closing inlets 60 and 53 and applying a vacuum to the valve 58 which in this instance would be located in higher position. After the shell 48 is evacuated, air may be admitted through the opening 53 to discharge the cake. Such a procedure may be used for instance if a similar filter is attached to an internal combustion engine and a vacuum may be produced from the intake manifold of the engine.

When attached to an internal combustion engine, the dischargeable type filter may be heated in any convenient manner, such as by the liquid coolant of the engine, the exhaust gases, a combination of exhaust gases and water jacket, electricity, steam, etc. In other instances, for example, when filtering aqueous solutions or water, no heat is necessary. This type filter may be used to filter fuel oil, and may be attached to a Diesel engine. A convenient method is to feed the filter from the transfer pump, and allow the filtrate to pass to the intake of the injection equipment. Thus a single filter made in accordance with the present invention would remove from the fuel oils all of the solids for which some Diesel engines filter the fuel as high as six successive times.

Another application of my improved filter medium, using either dischargeable or non-dischargeable types is to filter the fuel in automobiles.

When impregnating filter media used in filters like the plate and frame and other leaf types, the cake may be discharged by the customary practice which frequently is to open the filter and scrape off the cake.

The discharge of fine solids, however, is extremely difficult and I know of no other filter commercially available, except the closely assembled paper washer type, which will discharge these fine solids so that the filter may be used continuously without renewal for prolonged periods. In my invention, the finest solids may be removed and discharged so that even crank case oils may be continuously filtered.

In all instances, the resin impregnated filter medium is to be used in carrying out the present invention. The expression "resin impregnating" means that the filter medium has been dipped in, or sized with a potentially reactive resin prepared from phenol and formaldehyde which has been allowed to harden or the equivalent thereof. The sizing may be applied either in diluted or non-diluted form, and the hardening may be accomplished either by heat treatment or by the addition of a hardening agent.

Due to the construction described, my improved filter medium possesses the ability to withstand steaming when the latter process is used for sterilization purposes.

I am aware of the fact that layers of paper or sheets of fabric have been impregnated with synthetic resins resulting from the interaction of formaldehyde and phenol and baked under hydraulic pressure to produce dense laminated bodies, which are unsuitable for the filtration of fine solids from liquids and therefore do not broadly claim such a process, the present invention being distinguished therefrom by the provision of a resin treated material penetrable to liquids under pressure.

What is claimed is:

1. A filter element comprising a foraminous core, and a porous fluid penetrable fibrous covering around said core, said covering being impregnated with a polymerized resin having irreversible thermoplastic characteristics of phenol-formaldehyde resin, the amount of resin in the covering being insufficient to obstruct the pores of the covering.

2. A filter element comprising a pair of fluid penetrable superposed disks impregnated with a polymerized resinoid, said disks being disposed in aligned relationship and sealed at their common peripheries, and spacing means interposed between said disks for physically separating the body portions thereof, the pores of the said disks being substantially unobstructed.

3. A filter element comprising a pair of fluid penetrable superposed disks impregnated with a resinoid having irreversible thermoplastic characteristics of phenol-formaldehyde resin, said disks being disposed in aligned relationship and sealed at their common peripheries by a polymerized cement, and spacing means interposed between said disks for physically separating the body portions thereof, said spacing means being composed of a porous material impregnated with said resinoid.

4. A fluid-penetrable filter comprising a relatively thin porous body of fibers, the said fibers being uniformly impregnated over the entire filtering area thereof with a polymerized resin having irreversible thermoplastic characteristics similar to that of a phenol-formaldehyde resin, the pores of the body being substantially unobstructed.

5. A fluid-penetrable filter comprising a relatively thin porous body of fibers, the said fibers being uniformly impregnated over the entire filtering area thereof with a non-viscous resin which is allowed to polymerize after impregnation, the pores of the body being substantially unobstructed.

6. A liquid-penetrable filter comprising a porous body of fibers, the said fibers being uniformly impregnated over the entire filtering area thereof with a polymerized aldehyde resin having irreversible thermoplastic characteristics, the pores of the body being substantially unobstructed.

7. A fluid-penetrable filter comprising a relatively thin porous body of paper, the said paper being uniformly impregnated over the entire filtering area thereof with a polymerized resin having irreversible thermoplastic characteristics, the pores of the paper body being substantially unobstructed.

8. A fluid-penetrable filter comprising a relatively thin porous body of asbestos, the said asbestos being uniformly impregnated over the entire filtering area thereof with a polymerized resin having irreversible thermoplastic characteristics, the pores of the asbestos body being substantially unobstructed.

9. A fluid-penetrable filter comprising a relatively thin porous body of cellulose fibers, the said fibers being uniformly impregnated over the entire filtering area thereof with a polymerized resin having the irreversible thermoplastic characteristics of phenol-formaldehyde resin, the pores of the body being substantially unobstructed.

10. In the manufacture of filtering material, the steps which comprise impregnating a fluid penetrable sheet of porous material with a polymerizable resin and polymerizing the same, the amount of resin used being insufficient to substantially obstruct the pores of the sheet.

11. The method of preparing a filtering material which comprises forming a sheet of porous material, dipping the sheet into a solution of a polymerizable resin in a volatile solvent, and polymerizing the resin in the sheet, the amount of resin remaining in the sheet being insufficient to substantially obstruct the pores of the sheet.

12. A filter assembly including a plurality of leaves disposed in aligned relationship, each leaf comprising two disks composed of fibrous fluid-penetrable porous material uniformly impregnated with a polymerized resin having irreversible thermoplastic characteristics, the disks being sealed at their peripheries, said leaves being separated by spacing means, and means for conducting filtered fluid from between the disks of the leaves, the pores of the said disks being substantially unobstructed.

13. A filter assembly including a plurality of leaves disposed in aligned relationship, each leaf comprising two disks composed of fibrous fluid penetrable porous material uniformly impregnated with a polymerized resin having irreversible thermoplastic characteristics, the disk being sealed at their peripheries, said leaves being separated by spacers cemented to the adjacent faces of the leaves so that the finished filter assembly will operate in an accordion-like manner, and means for conducting filtered liquid from between the disks of the leaves, the pores of the said disks being substantially unobstructed.

DONALD H. WELLS.